(12) United States Patent
Marcepoil et al.

(10) Patent No.: US 9,720,262 B2
(45) Date of Patent: Aug. 1, 2017

(54) METHOD OF PROCESSING AN ORDER REQUEST FOR AN OPHTHALMIC LENS

(71) Applicant: ESSILOR INTERNATIONAL (COMPAGNIE GENERALE D'OPTIQUE), Charenton le Pont (FR)

(72) Inventors: Laurent Marcepoil, Charenton le Pont (FR); Jerome Concialdi, Charenton le Pont (FR); Frederic Dubois, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 14 days.

(21) Appl. No.: 14/365,317

(22) PCT Filed: Dec. 14, 2012

(86) PCT No.: PCT/EP2012/075590
§ 371 (c)(1),
(2) Date: Jun. 13, 2014

(87) PCT Pub. No.: WO2013/087860
PCT Pub. Date: Jun. 20, 2013

(65) Prior Publication Data
US 2014/0375950 A1    Dec. 25, 2014

(30) Foreign Application Priority Data
Dec. 15, 2011    (EP) .................................... 11306670

(51) Int. Cl.
*G05B 19/4097*    (2006.01)
*G02C 13/00*    (2006.01)
*B29D 11/00*    (2006.01)

(52) U.S. Cl.
CPC ...... *G02C 13/003* (2013.01); *B29D 11/00961* (2013.01); *G05B 19/4097* (2013.01); *G05B 2219/45157* (2013.01)

(58) Field of Classification Search
CPC ........ G02C 13/003; G02C 7/061; G02C 7/02; G02C 7/024–7/025; G02C 7/027–7/028;
(Continued)

(56) References Cited

U.S. PATENT DOCUMENTS

2010/0283957 A1* 11/2010 Matera ............. B29D 11/00634
351/49
2012/0105801 A1    5/2012 Yamakaji

FOREIGN PATENT DOCUMENTS

EP    2 196 306 A1    6/2010
EP    2 199 021 A1    6/2010
(Continued)

OTHER PUBLICATIONS

International Search Report, dated Apr. 5, 2013, from corresponding PCT application.
(Continued)

*Primary Examiner* — Scott J Sugarman
*Assistant Examiner* — Ibrahima Diedhiou
(74) *Attorney, Agent, or Firm* — Young & Thompson

(57) ABSTRACT

A method of processing an order request for an ophthalmic lens to be manufactured by a manufacturing device includes the following steps: receiving an order request including at least information related to an ophthalmic wearer's prescription by a first processing device; processing the order request by the first processing device on the basis of predetermined processing rules so as to obtain manufacturing parameters to be applied to the manufacturing device so as to manufacture the ophthalmic lens according to the information included in the order request; sending and storing the
(Continued)

manufacturing parameters identified as requiring a further modification to a storing device and sending the other manufacturing parameters to the manufacturing device; modifying the stored manufacturing parameters by a second processing device and sending the modified manufacturing parameters to the manufacturing device.

9 Claims, 2 Drawing Sheets

(58) Field of Classification Search
CPC .......... G02C 7/06; G02C 7/063; G02C 7/065; G02C 7/066; G02C 7/068; G02C 7/12; G02C 2202/22; B24B 13/005; B24B 13/0012; B24B 51/00; B29D 11/00942; B29D 11/00961; G05B 19/4097; G05B 2219/45157

USPC .......... 351/159.73, 159.74, 159.77, 351/159.41–159.43, 159.56; 700/103, 700/105, 110; 451/5

See application file for complete search history.

(56) References Cited

FOREIGN PATENT DOCUMENTS

| FR | WO 2010040757 A1 * | 4/2010 | ........... G06Q 10/087 |
|----|---------------------|--------|-------------------------|
| FR | EP 2199021 A1 * | 6/2010 | ........... B24B 13/005 |
| FR | WO 2011042504 A1 * | 4/2011 | ............. G02C 7/061 |
| WO | 2010087450 | 8/2010 | |
| WO | 2011/042504 A1 | 4/2011 | |

OTHER PUBLICATIONS

Japanese Office Action dated Sep. 5, 2016, with English Translation; Application No. 2014-546538.

\* cited by examiner

METHOD OF PROCESSING AN ORDER REQUEST FOR AN OPHTHALMIC LENS

The invention relates to a method of processing an order request for an ophthalmic lens to be manufactured by a manufacturing device, a lens manufacturing method for manufacturing an ophthalmic lens according to a request order, a processing system for processing an order request for an ophthalmic lens to be manufactured by a manufacturing device, and a computer program product for executing the methods according to the invention.

BACKGROUND OF THE INVENTION

Usually, an eye care professional orders, at an ordering side, an optical lens to an optical lab by sending an order request. The order request generally comprises at least wearer's data (and more particularly wearer's prescription data), lens frame data and lens data. The optical lab then determines lens manufacturing parameters based on the order request and manufactures a pair of ophthalmic lenses, at a lens manufacturing side.

An aim of the present invention is to improve the situation.

SUMMARY OF THE INVENTION

To that end, the present invention is related to a method of processing an order request for an ophthalmic lens to be manufactured by a manufacturing device comprising:
  an order request receiving step during which an order request comprising at least information related to an ophthalmic wearer's prescription is received by a first processing device,
  an order request processing step during which the order request is processed by the first processing device on the basis of predetermined processing rules so as to obtain manufacturing parameters to be applied to the manufacturing device so as to manufacture the ophthalmic lens according to the information comprised in the order request,
  a routing step during which the manufacturing parameters that are identified as requiring a further modification step are sent to and stored in a storing device and the other manufacturing parameters are sent to the manufacturing device,
  a parameter modification step during which the manufacturing parameters that are stored in the storing device are processed by a second processing device on the basis of predetermined modifying rules so as to obtain modified manufacturing parameters to be applied to the manufacturing device so as to manufacture an ophthalmic lens according to the information comprised in the order request and modifying information, the modified manufacturing parameters are sent to the manufacturing device.

Advantageously, the method according to the invention allows implementing further modifications only to the identified manufacturing parameters without having to change the processing method and system.

In other words, the method according to the invention allows modifying a limited number of identified manufacturing parameters while limiting the modifications that have to be done to the existing lens processing method.

According to further embodiments which can be considered alone or in combination:

prior to the routing step, the method according to the invention comprises:
  a ophthalmic lens type determining step during which the type of ophthalmic lens to be manufactured is determined, and
  a identification step during which the manufacturing parameters identified as requiring a further modification step are identified based on the determined type of ophthalmic lens to be manufactured;
during the parameter modification step, the manufacturing parameters are modified so as to correct position error of the respective position of the surfaces of the ophthalmic lens;
manufacturing parameters corresponding to an ophthalmic lens having two complexes surfaces are identified as requiring a further modification step;
manufacturing parameters corresponding to an ophthalmic lens having at least a polarized surface are identified as requiring a further modification step; and/or
manufacturing parameters corresponding to a multifocal ophthalmic lens are identified as requiring a further modification step.

The invention also relates to a lens manufacturing method for manufacturing an ophthalmic lens according to a request order, the method comprising:
  processing the order request according to the method of the invention,
  manufacturing the ophthalmic lens using the manufacturing device and according to the manufacturing parameters sent to the manufacturing device.

The invention further relates to a processing system for processing an order request for an ophthalmic lens to be manufactured by a manufacturing device, comprising:
  a first processing device for processing an order request of an ophthalmic lens, comprising:
    receiving means arranged for receiving an order request comprising at least information related to an ophthalmic wearer's prescription,
    processing means arranged for processing the order request on the basis of predetermined processing rules so as to obtain manufacturing parameters to be applied to the manufacturing device so as to manufacture the ophthalmic lens, according to the information comprised in the order request,
  a routing device arranged for sending the obtained manufacturing parameters that are identified as requiring a further modification to a storing device and the other obtained manufacturing parameters to the manufacturing device,
  a modifying device arranged for manufacturing parameters that are stored in the storing device on the basis of predetermined modifying rules so as to obtain modified manufacturing parameters to be applied to the manufacturing device so as to manufacture an ophthalmic lens according to the information comprised in the order request and for sending the modification parameters to the manufacturing device.

The invention also relates to a computer program product comprising one or more stored sequence of instruction that is accessible to a processor and which, when executed by the processor, causes the processor to carry out the steps of any method according to the invention.

The invention further relates to a computer readable medium carrying one or more sequences of instructions of the computer program product according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In the sense of the invention "the manufacturing parameters" are the setting parameter of the different manufacturing devices involved in the manufacturing process.

BRIEF DESCRIPTION OF THE DRAWINGS

Non limiting embodiments of the invention will now be described with reference to the following drawings, wherein.

DETAILED DESCRIPTION OF THE PREFERRED EMBODIMENTS

Figure 1:
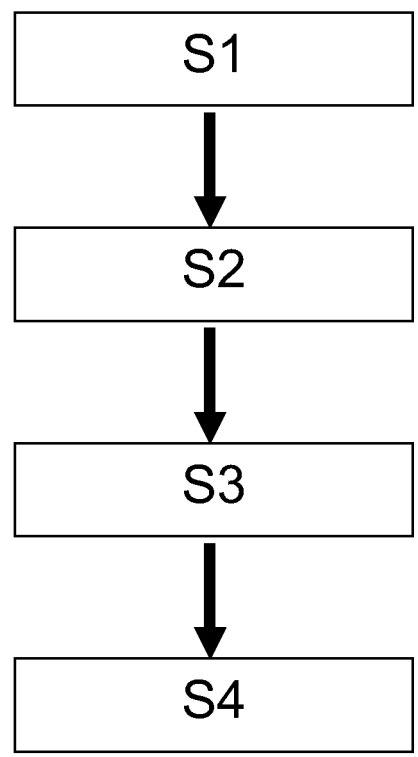
FIG. 1 is a flowchart of the steps comprised in a method of processing an order request according to an embodiment of the invention.

As illustrated on FIG. 1, the invention relates to method, for example implemented by computer means, of processing an order request for an ophthalmic lens to be manufactured by a manufacturing device comprising:
an order request receiving step S1,
an order request processing step S2,
a routing step S3, and
a parameter modification step S4.

During the order request receiving step S1 an order request is received by a first processing device. The order request comprises information relating at least to the ophthalmic wearer's prescription.

According to an embodiment of the invention the order request may comprise information related to the choice of spectacle frame from the wearer, the choice of a front face curvatures of the ophthalmic lens by the wearer or the optician, or any customising parameters selected either by the wearer or the optician.

During the order request processing step S2, the order request is processed by the first processing device. The order request may be processed on the basis of predetermined processing rules so as to obtain manufacturing parameters to be applied to the manufacturing device so as to manufacture the ophthalmic lens according to the information comprised in the order request.

The predetermined processing rules may comprise rules for selecting in a data base the most appropriate optical design for the ophthalmic lens. In addition or alternatively, the predetermined processing rules may comprise rules for calculating parameters of the ophthalmic lens so as to obtain the most appropriate optical design of the ophthalmic lens, for example the rules for calculating such parameter may be based on adapted formula. The predetermined processing rules represent part of the know-how of the lens provider.

After having determined the manufacturing parameters, the method comprises a routing step S3. During the routing step S3, the manufacturing parameters that are identified as requiring a further modification step are sent to and stored in a storing device. The other manufacturing parameters are sent to the manufacturing device.

According to an embodiment of the invention, the routing step comprises a test step during which the manufacturing parameters are tested according to predetermined criteria so as to identify the manufacturing parameters that require further modification from the manufacturing parameters that require no further modification.

According to an embodiment of the invention, prior to the routing step the method comprises prior to the routing step,
an ophthalmic lens type determining step, and
an identification step.

During the ophthalmic lens type determining step, the type of ophthalmic lens to be manufactured is determined. The type of ophthalmic lens can be specified in the order request or determined based on the information included in the order request, for the example the wearer's prescription.

During the identification step, the identification of the parameters requesting further modification is based on the determined type of ophthalmic lens to be manufactured.

Indeed, depending on the type of ophthalmic lens, it may be more or least required to further modify the manufacturing parameters.

An optical lens is typically made of plastic or glass material and generally has two opposing surfaces which co-operate with one another to provide a required corrective prescription. When the positioning or shape of one of these surfaces with respect to the other is inaccurate, optical errors can occur.

Manufacturing of an optical lens to the required prescription requirements typically includes machining the surface of a semi-finished lens or lens blank.

Typically, a semi-finished lens has a finished surface, for example the front surface and an unfinished surface, for example the back surface. By machining the back surface of the lens to remove material, the required shape and positioning of the back surface with respect to the front surface for the desired corrective prescription can be generated.

Conventionally, a semi-finished lens is provided with engraved markings on the finished surface. The engraved markings define a reference system of the design of the finished surface of the lens.

So as to manufacture accurately the unfinished surface of the semi-finished lens, the semi-finished lens is maintained by blocking the finished surface of the lens on a blocker. It may be difficult to accurately determine the position in which the semi-finished lens is blocked. An inaccurate position of the semi-finished lens on the blocker may create optical errors in the final lens.

Depending on the type of ophthalmic lens a position error of one of the surfaces with respect to the other may create great optical disruption.

Thus, according to an embodiment of the invention, the identified manufacturing parameters are modified so as to correct position error of the respective position of the surfaces of the ophthalmic lens. An example of method for correcting such positioning error is disclosed in EP 2 199 021.

According to an embodiment of the invention, manufacturing parameters corresponding to an ophthalmic lens having two complexes surfaces are identified as requiring a further modification step. Thus, such manufacturing parameters are sent to the storing device.

In the sense of the invention, "a complex surface" is a continuous or non-continuous surface without point of symmetry, for example a complex surface may be a progressive surface.

By "progressive surface" is meant a surface, which is not rotationally symmetrical, with a continuous change of curvature over a part of whole of the surface as defined in ISO-Standard ISO 13666:1998(E/F).

According to an embodiment of the invention, the manufacturing parameters corresponding to an ophthalmic lens having at least a polarized surface and/or multifocal ophthalmic lens are identified as requiring a further modification step.

During the parameter modification step S4, the manufacturing parameters that are stored in the storing device are processed by a second processing device. The second processing device be arranged so as to process the manufacturing parameters on the basis of predetermined modifying rules.

The modified manufacturing parameters are then sent to the manufacturing device.

According to an aspect of the invention, the method may comprise a further manufacturing step during which the ophthalmic lens is manufactured based on the modified or non-modified manufacturing parameters.

Figure 2:
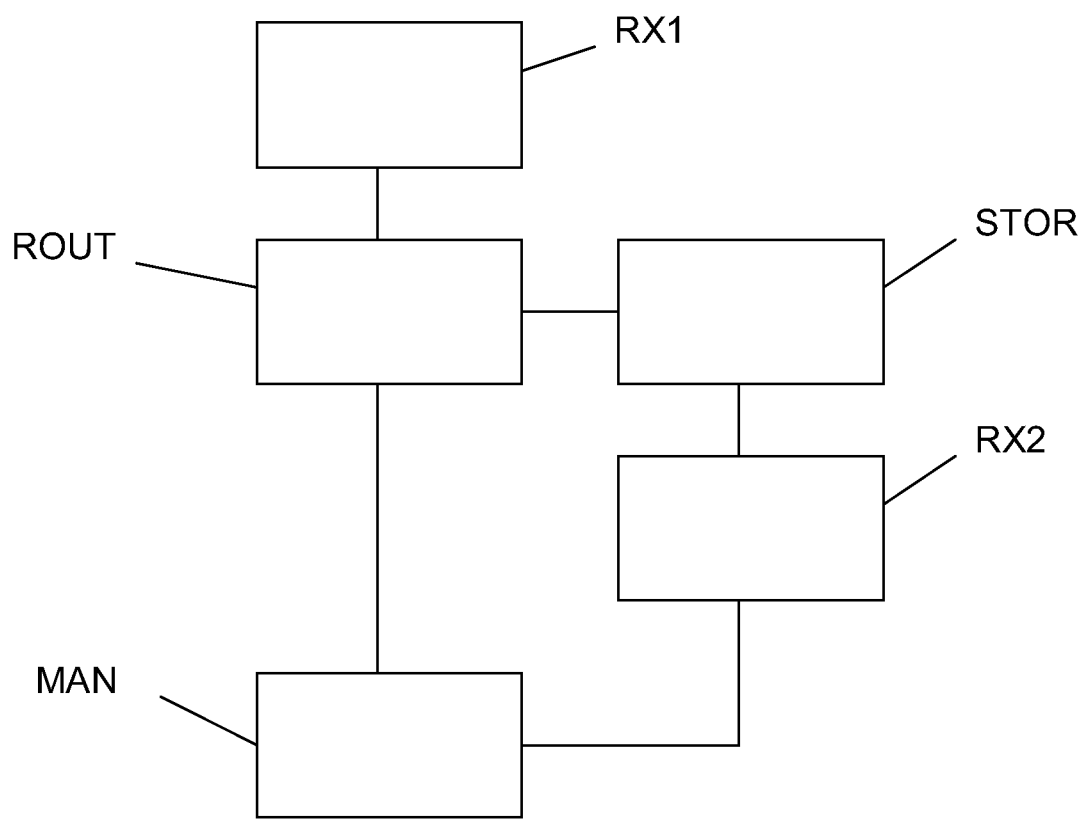
FIG. 2 is a schematic drawing illustrating a processing system for processing an order request of an ophthalmic lens according to an embodiment of the invention.

According to an embodiment of the invention the processing method according to the invention may be carried out by a processing system, as illustrated on FIG. 2.

The processing system illustrated on FIG. 2 comprises:
a first processing device RX1,
a routing device ROUT,
a storing device STOR,
a second processing device RX2, and
a manufacturing device MAN.

According to an embodiment of the invention, the first processing device RX1 may comprise receiving means, for example a receiver, and processing means, for example a processor.

The receiving means, are arranged to carry out the order request receiving step S1 of the method according to the invention. In particular, the receiving means are arranged to receive an order request comprising at least information related to an ophthalmic wearer's prescription.

The processing means are arranged to carry out the order request processing step S2 of the method according to the invention. In particular, processing means are arranged for processing the order request on the basis of predetermined processing rules so as to obtain manufacturing parameters to be applied to the manufacturing device so as to manufacture the ophthalmic lens, according to the information comprised in the order request.

The routing device Rout is arranged to carry out the routing step S3 of the method according to the invention. In particular, the routing device comprises an identifier sending the obtained manufacturing parameters that are identified as requiring a further modification to the storing device STOR and the other obtained manufacturing parameters to the manufacturing device MAN. The routing means may be hardware or software routing means. The storing device can be any type of hardware arranged for storing a data, for example a hard disk, a flash memory or any other means know by the skilled person.

The modifying device is arranged to carry out the parameter modifying step S4. In particular the modifying device may be a processor programmed so as modify the manufacturing parameters that are stored in the storing device. Such modification may be carried out on the basis of predetermined modifying rules so as to obtain modified manufacturing parameters. The modifying device is further arranged for sending the modified parameters to a manufacturing device MAN.

The invention has been described above with the aid of embodiments without limiting the general inventive concept of the invention.

The invention claimed is:

1. A method of processing an order request for an ophthalmic lens to be manufactured by a manufacturing device, comprising:
    an order request receiving step (S1), during which an order request comprising at least information related to an ophthalmic wearer's prescription is received directly by a first processing device;
    an order request processing step (S2), during which the order request is processed by the first processing device on the basis of predetermined processing rules so as to obtain manufacturing parameters to be applied to the manufacturing device so as to manufacture the ophthalmic lens according to the information comprised in the order request;
    a routing step (S3), during which manufacturing parameters identified as requiring a further modification step are sent to and stored in a storing device, and other manufacturing parameters not identified as requiring a further modification step are sent to the manufacturing device;
    a parameter modification step (S4), during which the manufacturing parameters stored in the storing device are processed by a second processing device on the basis of predetermined modifying rules so as to obtain modified manufacturing parameters to be applied to the manufacturing device so as to manufacture an ophthalmic lens according to the information comprised in the order request and modifying information; and
    sending the modified manufacturing parameters to the manufacturing device.

2. The method according to claim 1, further comprising, prior to the routing step:

a ophthalmic lens type determining step, during which the type of ophthalmic lens to be manufactured is determined; and a identification step, during which the manufacturing parameters identified as requiring a further modification step are identified based on the determined type of ophthalmic lens to be manufactured.

3. The method according to claim 1, wherein during the parameter modification step, the manufacturing parameters are modified so as to correct position error of the respective position of the surfaces of the ophthalmic lens.

4. The method according to claim 1, wherein manufacturing parameters corresponding to an ophthalmic lens having two complexes surfaces are identified as requiring a further modification step.

5. The method according to claim 1, wherein manufacturing parameters corresponding to an ophthalmic lens having at least a polarized surface are identified as requiring a further modification step.

6. The method according to claim 1, wherein manufacturing parameters corresponding to a multifocal ophthalmic lens are identified as requiring a further modification step.

7. A lens manufacturing method for manufacturing an ophthalmic lens according to a request order, the method comprising:

processing the order request according to the method of claim 1; and manufacturing the ophthalmic lens using the manufacturing device and according to the manufacturing parameters sent to the manufacturing device.

8. A processing system for processing an order request for an ophthalmic lens to be manufactured by a manufacturing device, comprising:

a first processing device (RX1) that processes an order request of an ophthalmic lens, comprising:

receiving means arranged for directly receiving the order request, the order request comprising at least information related to an ophthalmic wearer's prescription, and processing means arranged for processing the order request on the basis of predetermined processing rules so as to obtain manufacturing parameters to be applied to the manufacturing device so as to manufacture the ophthalmic lens, according to the information comprised in the order request;

a routing device (ROUT) that sends obtained manufacturing parameters identified as requiring a further modification to a storing device (STOR), and that sends other obtained manufacturing parameters not identified as requiring a further modification step to the manufacturing device (MAN); and a modifying device (RX2) that processes manufacturing parameters stored in the storing device on the basis of predetermined modifying rules so as to obtain modified manufacturing parameters to be applied to the manufacturing device so as to manufacture an ophthalmic lens according to the information comprised in the order request and for sending the modification parameters to the manufacturing device (MAN), wherein the modifying device (RX2) is a second processing device separate from the first processing device (RX1).

9. A non-transitory computer readable medium, having stored thereon a computer program comprising one or more stored sequence of instruction that is accessible to a processor and which, when executed by the processor, causes the processor to carry out the steps of claim 1.

* * * * *